United States Patent [19]

Pricer

[11] Patent Number: 5,594,883
[45] Date of Patent: Jan. 14, 1997

[54] HIERARCHICAL DATA STORAGE SYSTEM EMPLOYING CONTEMPORANEOUS TRANSFER OF DESIGNATED DATA PAGES TO LONG WRITE AND SHORT READ CYCLE MEMORY

[75] Inventor: Wilbur D. Pricer, Burlington, Vt.

[73] Assignee: International Business Machines Corporation, Armonk, N.Y.

[21] Appl. No.: 556,671

[22] Filed: Nov. 13, 1995

Related U.S. Application Data

[63] Continuation of Ser. No. 48,409, Apr. 14, 1993, abandoned.

[51] Int. Cl.⁶ ............................................. G06F 12/08
[52] U.S. Cl. .................. 395/440; 395/463; 395/492; 395/471
[58] Field of Search ............................. 395/440, 463, 395/492, 403, 471

[56] References Cited

U.S. PATENT DOCUMENTS

| | | | |
|---|---|---|---|
| 4,295,205 | 10/1981 | Kunstadt | 364/900 |
| 4,394,732 | 7/1983 | Swenson | 395/425 |
| 4,456,971 | 6/1984 | Fukuda et al. | 364/900 |
| 4,467,421 | 8/1984 | White | 364/200 |
| 4,504,902 | 3/1985 | Gallaher et al. | 395/425 |
| 4,627,021 | 12/1986 | Persoon et al. | 395/800 |
| 4,727,512 | 2/1988 | Birkner et al. | 364/900 |
| 4,887,236 | 12/1989 | Schloemann | 365/173 |
| 4,890,259 | 12/1989 | Simko | 365/45 |
| 4,896,262 | 1/1990 | Wayama et al. | 364/200 |
| 4,920,478 | 4/1990 | Furuya et al. | 395/425 |
| 4,956,803 | 9/1990 | Tayler et al. | 395/425 |
| 4,958,315 | 9/1990 | Balch | 364/900 |
| 5,033,027 | 7/1991 | Amin | 365/222 |
| 5,093,809 | 3/1992 | Shmitt-Landsiedel et al. | 365/230.03 |
| 5,142,627 | 8/1992 | Elliot et al. | 395/275 |
| 5,146,576 | 9/1992 | Beardsley et al. | 395/425 |
| 5,206,939 | 4/1993 | Yanai et al. | 395/400 |
| 5,253,351 | 10/1993 | Yamamoto et al. | 395/425 |
| 5,276,835 | 1/1994 | Mohan et al. | 395/425 |
| 5,293,609 | 3/1994 | Shih et al. | 395/425 |
| 5,313,612 | 5/1994 | Satoh et al. | 395/425 |
| 5,321,845 | 6/1994 | Sawase et al. | 395/800 |
| 5,353,430 | 10/1994 | Lautzenheiser | 395/425 |
| 5,388,242 | 2/1995 | Jewett | 395/425 |
| 5,394,532 | 2/1995 | Belsan | 395/425 |

OTHER PUBLICATIONS

Stallings, William, Ph.D., "Computer Organization and Architecture, Principles of Structure and Function", Macmillan Publishing Company, pp. 89–92 & 113, 1987.

*Primary Examiner*—Matthew M. Kim
*Attorney, Agent, or Firm*—Heslin & Rothenberg, P.C.

[57] ABSTRACT

A method and system control approach for contemporaneous transfer of designated replacement pages from a main store to an associated memory having a write cycle 10× longer than a read cycle thereof (e.g. nonvolatile semiconductor memory). Each designated data page includes an associated home address within the nonvolatile semiconductor memory. The approach includes designating at least two data pages of the main store for transfer to the nonvolatile semiconductor memory; and upon occurrence of a predetermined condition, contemporaneously transferring the designated data pages from the main store to the nonvolatile semiconductor memory for writing into the nonvolatile semiconductor memory at their associated addresses. Preferably, the designated data pages are simultaneously written in the nonvolatile semiconductor memory subsequent to a simultaneous erase of their associated home addresses.

25 Claims, 4 Drawing Sheets

HIERARCHICAL DATA STORAGE SYSTEM EMPLOYING CONTEMPORANEOUS TRANSFER OF DESIGNATED DATA PAGES TO LONG WRITE AND SHORT READ CYCLE MEMORY

This application is a continuation of application Ser. No. 08/048,409, filed Apr. 14, 1993, now abandoned.

TECHNICAL FIELD

The present invention relates in general to data processing and data storage, and more particularly, to control techniques for transfer of data between different memories (such as a main store and a nonvolatile semiconductor memory) of a hierarchical memory structure in a computer system or a multicomputer system.

BACKGROUND ART

The advantages associated with organizing data processing memory into a hierarchical structure are well recognized in the art. By way of example, a processing system's internal memory may be organized as CPU registers, cache, backing (or bulk, auxiliary or secondary) memory and external memory. Today, external memory is most often implemented as a magnetic storage device, such as a magnetic direct access storage device (DASD). Magnetic disc storage typically comprises random access storage (i.e., direct access storage) in which any location designated by address can be accessed (data searched) within the same access time irrespective of a preceding access address. The drawback to magnetic storage is that higher power rates are necessary to operate the device, which is particularly significant today in view of the trend towards portability in the computer industry.

Nonvolatile semiconductor storage and other technologies such as optical storage require less power and have several orders of magnitude significantly better read access times (e.g., nanoseconds) compared with read access time for magnetic disc storage (e.g., milliseconds). In addition, projections indicate that the cost effectiveness of nonvolatile semiconductor storage will one day overtake that of magnetic storage DASD.

Although nonvolatile semiconductor read access cycle time is on the order of 100 ns, write access cycle times are still at least several orders of magnitude greater. Nominal values of 1 ms –1 sec for a write operation are common. As a specific example, consider a memory hierarchy including a cache, backing storage and a memory in which the write cycle is at least 10× (an order of magnitude) longer than the read cycle (e.g. nonvolatile semiconductor memory). In a well mannered system, a cache hit ratio of 99% might be obtained, along with a backing store hit ratio of 95%. Given these numbers and employing a 20 MHz processor, one process cycle in 2,000 can be expected to initiate a replacement page transfer from backing store to nonvolatile semiconductor memory. However, not all page transfers require a write operation into the direct access storage device.

Continuing with the example (and assuming that one-third of the transfer replacement pages need to actually be rewritten in the nonvolatile semiconductor memory), it can be shown that a write operation in the nonvolatile semiconductor memory proceeds at a slower rate than the frequency of page transfer operations (generated by the CPU) moving replacement pages from the backing store to the nonvolatile semiconductor memory. Thus, a significant data blockage can occur in a relatively short period of time, and the superior access time of the nonvolatile semiconductor memory would rarely be realized since almost all access to this memory will encounter a write cycle already in progress.

Therefore, a genuine need exists in the data processing art for a control technique for managing the transfer of data between certain memories of a hierarchical memory structure (including main store and long-write-cycle memory) in order to reduce the possibility of multiple write operations effectively blocking executing read operations between the main store and nonvolatile semiconductor memory. The present invention addresses this need; and, thereby, significantly enhances the capability of a system designer to provide a practical data processing system implementation employing nonvolatile semiconductor storage.

DISCLOSURE OF THE INVENTION

Briefly summarized, the invention comprises in one aspect a control method for grouped transfer of data pages from a main store of a data processing system to an associated long-write-cycle memory. Each data page is assumed to have a corresponding home address in the long-write-cycle memory. The control method includes the steps of: designating at least two data pages in the main store for transfer to the long-write-cycle memory; and upon occurrence of a predetermined condition, contemporaneously transferring the at least two designated data pages from the main store to the long-write-cycle memory via an interconnecting data bus for writing at their associated home addresses. Various predetermined conditions are possible, including a predefined count of designated data pages, and/or overlapping associated home address for 'X' designated data pages, wherein 'X'$\geq$2. The transferred designated data pages are simultaneously written into the memory. Further enhancements to the basic process are discussed.

In another aspect of the present invention, a method for simultaneously writing a plurality of designated data blocks from a main storage buffer into multiple long-write-cycle memory chips is presented. Each one of the multiple semiconductor memories includes a plurality of memory cells. This method includes the steps of: writing 'N' data blocks from the multiple memories into the main storage buffer (the main storage buffer having 'Z' data blocks previously stored therein); designating a replacement data block from the 'Z' data blocks for each of at least some of the 'N' data blocks written into the main storage buffer; and thereafter simultaneously writing designated data blocks of the main storage buffer into the multiple memories. Preferably, the simultaneous writing occurs subsequent to one of several possible predetermined conditions, examples of which are provided herein. Various method enhancements are also presented.

As still another aspect of the present invention, a data processing system is defined having a central processor, a main store associated with the central processor for holding data pages to be processed, a memory having a long write cycle and a short read cycle for holding data pages at associated addresses and a data bus coupled between the main store and the memory. Pursuant to the invention, a mechanism is provided for controlling transfer of data from the main store to the memory. This transfer control mechanism includes a mechanism for designating at least two data pages in the main store for contemporaneous transfer to the memory, and a mechanism for transferring upon occurrence of a predetermined condition the at least two designated data pages from the main store to the memory via the data bus for writing into the memory at their associated addresses. Specific system enhancements are also discussed.

The advantages to the approach presented are numerous. The occurrence of write blockage can be reduced by a factor of 100 or more. Thus, data processing systems can take full advantage of the improved read access time offered by long write cycle memory. The memory allocation within the main store for designated data pages is minimal, and the data allocated for replacement is still available for accessing by the CPU while awaiting contemporaneous writing into the nonvolatile semiconductor memory. Employing a simultaneous erase cycle within nonvolatile semiconductor memory presents more than enough time to mask serial transfer of data pages along with their associated addresses needed for a subsequent parallel write operation within the nonvolatile semiconductor memory. The approach can be employed with any hierarchical memory structure for any computer system or multicomputer system employing a slow write time memory as one of the levels within the hierarchical memory.

BRIEF DESCRIPTION OF DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

Figure 1:
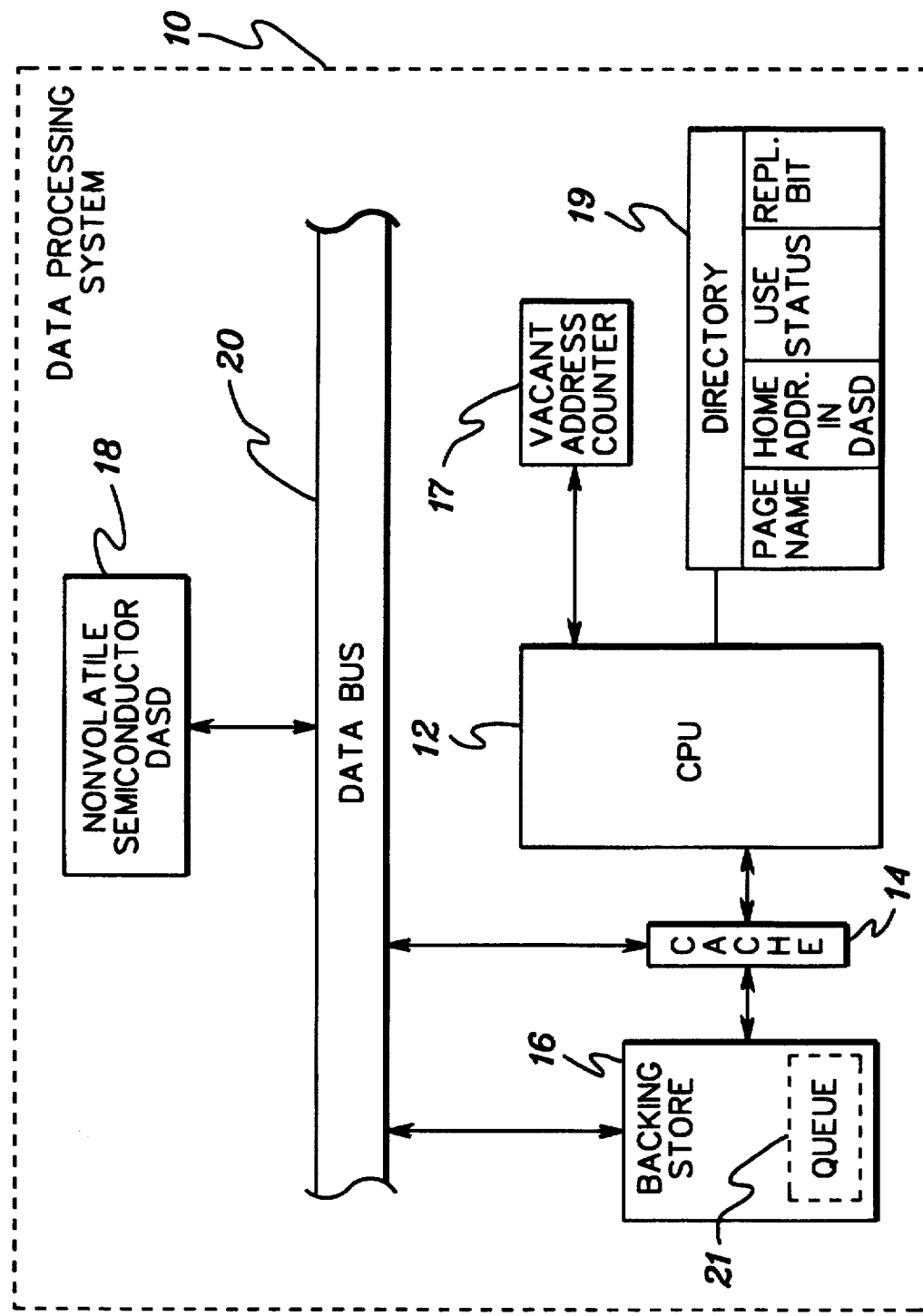
FIG. 1 is a block diagram representation of a data processing system employing data transfer and storage techniques pursuant to the present invention.

Pursuant to this invention, the performance degradation inherent in memory technologies in which the write cycle is substantially longer than the read cycle (e.g. nonvolatile semiconductor memory such as EEPROMs, EPROMs, etc.) is greatly eased, if not eliminated, through a data transfer management routine. The invention makes note of the fact that there are numerous "replacement algorithms" described in the open literature for designating when an information block (or data page) should be transferred from a main store (i.e., a backing store and/or a cache) to an associated nonvolatile semiconductor memory.

Perhaps the most commonly employed replacement algorithm is referred to as the "least recently used" approach. With this algorithm, the data pages held in a "full" backing store and/or cache are monitored so that when additional data must be brought up from nonvolatile semiconductor memory, the least used data page is singled out (i.e., "designated") as the replacement page and immediately transferred to the direct access storage device to make room for the new data page being brought up. The present invention can employ this 'least recently used' (or any other known approach) to "designating" a replacement page. The following discussion assumes that the management software implements a conventional approach to "designating" a replacement page. The difference is that there is no immediate transfer of a designated page to nonvolatile semiconductor memory.

In accordance with the present invention, a data processor's backing memory is loaded with data pages from nonvolatile semiconductor memory under control of the processor until a relatively small number (e.g., sixteen) of vacant page addresses remain within the backing memory. Once the small number of remaining addresses is reached, each future page retrieval from the nonvolatile semiconductor memory results in a page being "designated" for eventual replacement (i.e., for future transfer from backing memory to the nonvolatile semiconductor memory). Again, note that (pursuant to the present invention) there is no immediate transfer of a designated replacement page(s), but rather information is held for future, contemporaneous transfer of the replacement pages.

Once a predetermined condition (discussed below) is satisfied, all designated replacement pages are contemporaneously transferred from the backing store to the nonvolatile semiconductor memory. In one embodiment, the predefined condition might comprise an overlapping of "home addresses" assigned to two (or more) designated replacement pages. (The term "home address" is used herein to refer to an actual or virtual chip address within the nonvolatile semiconductor memory and two pages have "overlapping home addresses" whenever they are to be written to the same memory chip or virtual chip address in nonvolatile semiconductor memory.)

Whenever the predetermined condition is met, all designated replacement pages are transferred contemporaneously (i.e., as a group) from the backing memory to the nonvolatile semiconductor memory. A directory function is employed to initiate a parallel erase at the home addresses of the designated data pages, which is followed by a parallel write (preferably) of all designated data pages into the nonvolatile semiconductor memory. Using this approach, the last designated replacement page is held in backing memory as the first page in the next grouping of replacement pages to be ultimately transferred to the DASD. (This is because the last designated replacement page is assumed to have had an "overlapping home address" with a previously designated replacement page, which would prohibit a parallel write function.) In place of a predetermined "overlapping" condition, or as an alternative condition, occurrence of a predefined threshold number 'X' of designated replacement pages may be employed as the event to initiate transfer of data to the nonvolatile semiconductor memory. Several detailed embodiments of data page transfer routines pursuant to the present invention follow.

By way of example, FIG. 1 depicts a data processing system, generally denoted 10, having a central processor (CPU) 12, a cache 14 and a backing store 16. CPU 12, cache 14 and backing store 16 may be fabricated on the same (or different) integrated circuit chip(s). A data bus 20 allows transfer of information blocks (herein referred to as "data pages") between a nonvolatile semiconductor memory (e.g., a DASD) 18 and backing memory 16 and/or cache 14. (Data may be transferred directly from DASD 18 to cache 14 or indirectly via backing store 16.) A three level hierarchical memory is thus depicted wherein the lowest level comprises nonvolatile semiconductor memory 18, the middle level comprises backing store 16, and the upper level consists of cache 14. (The invention is equally applicable to other hierarchical memory structures, including a more basic two level arrangement wherein the CPU communicates with a main memory which communicates with the nonvolatile semiconductor memory.)

The number of replacement pages already grouped in backing store can be conveniently tracked using a vacant address counter 17. Further, a directory function data structure 19 including page name, home address in DASD, use status and replacement bit can be employed. Counter 17 and directory 19 may comprise hardware registers or memory locations, for example, in backing store 16. These counter and directory functions can be readily implemented by one of ordinary skill in the art.

Figure 2:
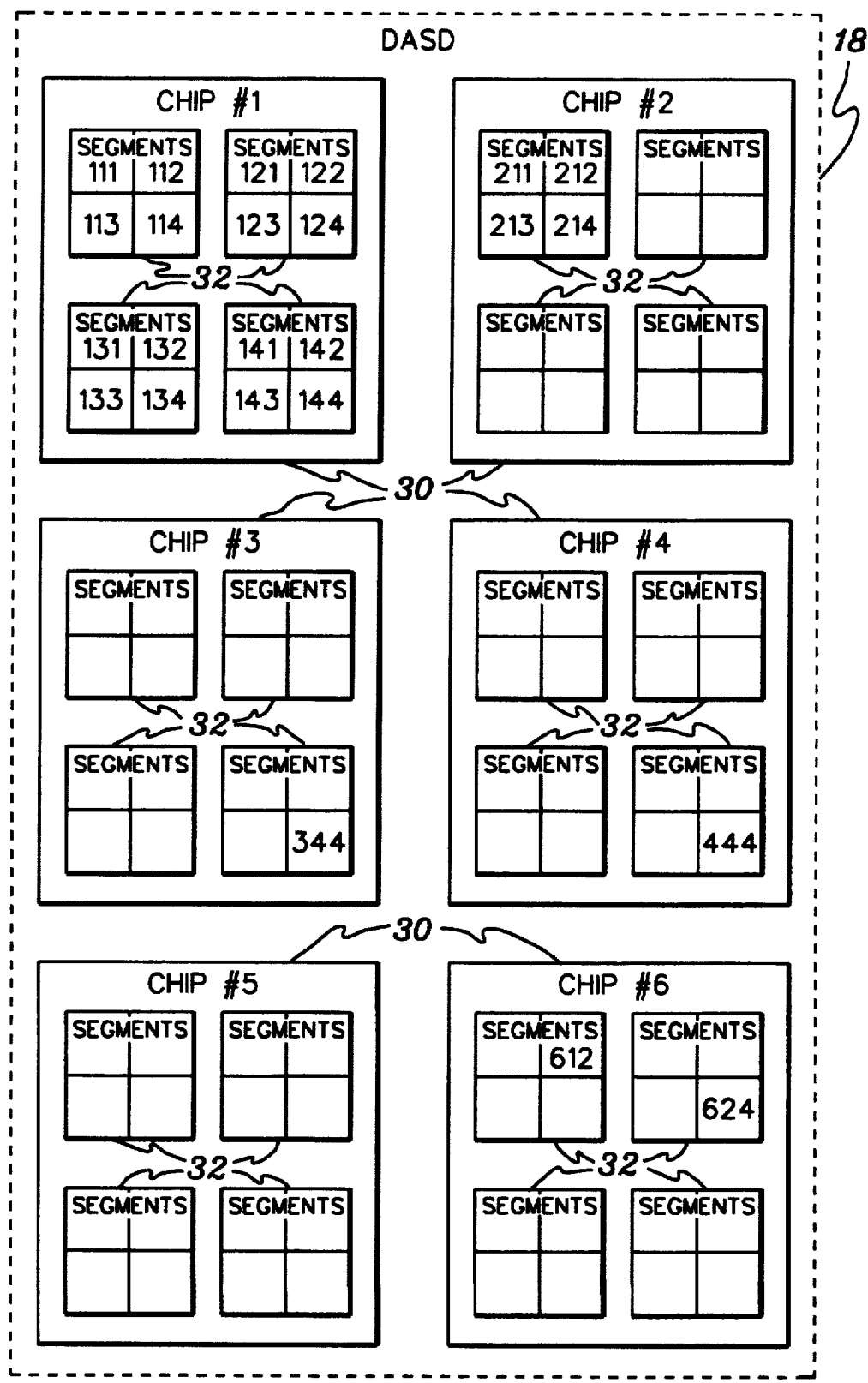
FIG. 2 is a simplified block diagram of a nonvolatile semiconductor memory into which data pages are transferred and stored pursuant to the present invention.

In one embodiment of DASD 18 (shown in FIG. 2) six separate actual or virtual memory chips 30 are employed, each of which is segregated into multiple segments 32. Each segment 32 is assumed to hold multiple data pages of information, with each data page having a unique address (e.g.: 111, 112, 113, 114, 121, 122, 123, 124, 131, 132, 133, 134, 141, 142, 143, 144, 211, 212, 213, 214 . . . 344 . . . , 444 . . . , 612 . . . 624 . . . ). Read, erase and write operations can be performed within each chip 30 independent of all other chips in DASD 18, and (where employed) each segment 32 of a particular chip 30 is assumed to be independent of all other memory segments of the same chip such that multiple simultaneous read, erase and write operations are possible on the segment level of a given chip. Parallel page writes, however, are not possible within the same memory segment.

Figure 3:
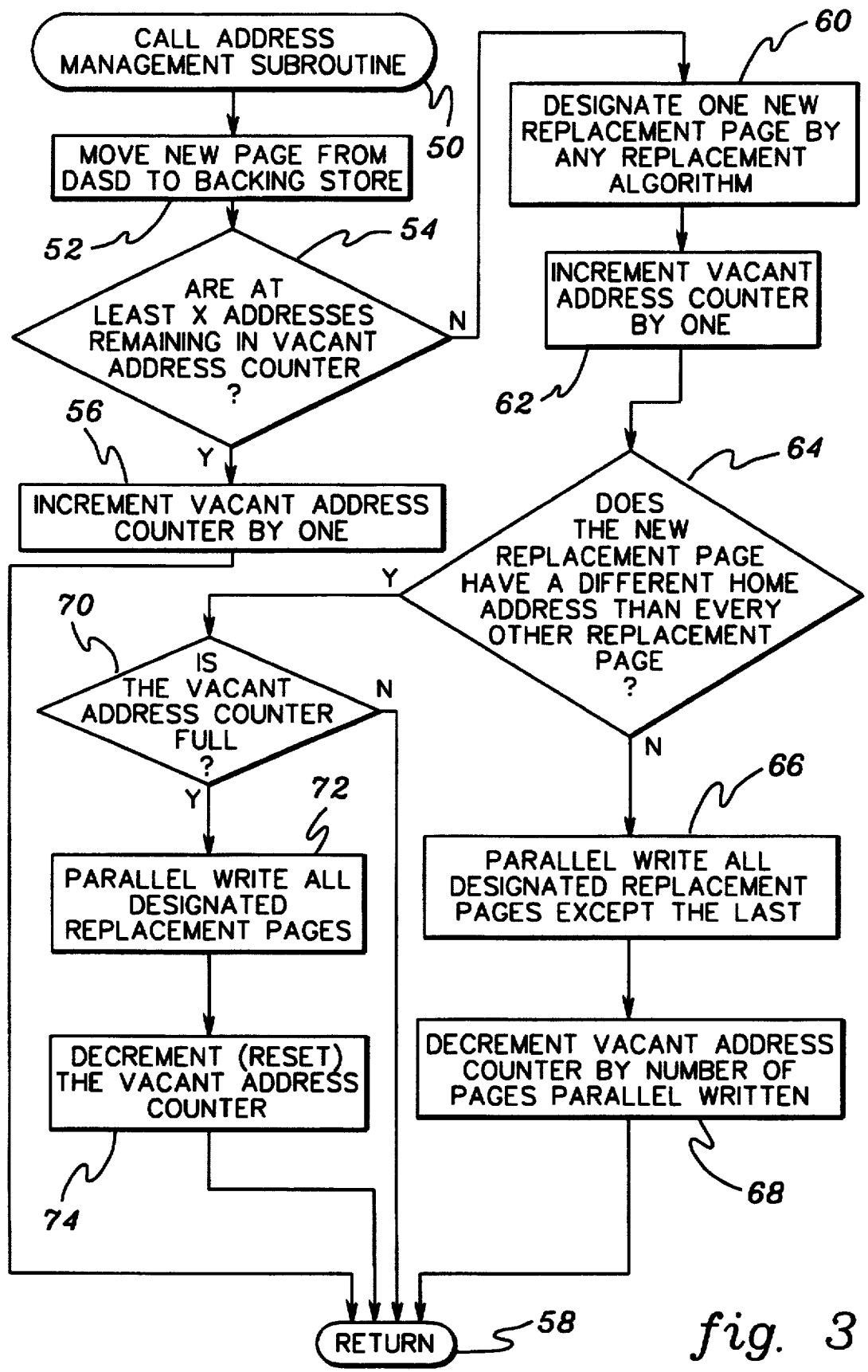
FIG. 3 is a flowchart of one embodiment of a replacement page management subroutine pursuant to the present invention for control of data transfer from a backing store to nonvolatile semiconductor memory.

In a first transfer routine pursuant to the invention, depicted in FIG. 3, an assumption is made that memory 18 contains a plurality of separate memory chips, with no memory chip being segmented for multiple parallel operations. The routine embodiment is initiated as a called subroutine, 50 "Call Address Management Subroutine," whenever a new page is transferred from nonvolatile semiconductor memory (DASD) to the main (backing) storage, 52 "Move New Page From DASD To Backing Store." An inquiry is then made into whether a predefined number 'X' of vacant address spaces remain in backing storage, 54 "Are At Least X Addresses Remaining In Vacant Address Counter?" (As noted, the number of vacant page addresses can be tracked through use of vacant address counter 17 in system 10 (FIG. 1).) If more than the threshold level 'X' of addresses remain, then the vacant address counter is simply incremented, 56 "Increment Vacant Address Counter By One," and processing returns to the point of call, 58 "Return."

Once the threshold number 'X' of vacant addresses is reached, a new replacement page is designated within the backing store for each page transferred from the DASD to the backing store, 60 "Designate One New Replacement Page By Any Replacement Algorithm." Again, numerous approaches to "designating" replacement pages are available in the open literature; for example, the above-discussed 'least recently used' replacement technique could be employed. Upon "designation" of a new replacement page, the vacant address counter is incremented, 62 "Increment Vacant Address Counter By One," and inquiry is made into whether the new replacement page has a different home address than all previous designated replacement pages still held in the backing store, 64 "Does The New Replacement Page Have A Different Home Address Than Every Other Replacement Page?" If "no", then (pursuant to this embodiment) a parallel erase operation and a parallel write operation for all designated replacement pages (except the most recent replacement page) are conducted, thereby transferring the pages from the main store to the nonvolatile semiconductor memory, 66 "Parallel Write All Designated Replacement Pages Except The Last." Thereafter, the vacant address counter is decremented by the number of pages transferred to the nonvolatile semiconductor memory, 68 "Decrement Vacant Address Counter By Number of Pages Parallel Written," and processing returns to point of call, 58 "Return."

If the new replacement page has a unique home address in comparison with every prior designated replacement page still held in the backing store, then inquiry is made into whether the vacant address counter is full, 70 "Is The Vacant Address Counter Full?" If "no", then processing returns to point of call since neither predetermined condition for data transfer has occurred, 58 "Return." However, if the vacant address counter is now full from designating the latest replacement page, then (pursuant to this embodiment) all designated replacement pages are parallel written from the backing store to the nonvolatile semiconductor memory, 72 "Parallel Write All Designated Replacement Pages," and the vacant address counter is reset, 74 "Decrement (Reset) The Vacant Address Counter."

Where the memory hierarchy offers limited set associativity in the backing store, or where the hierarchy is limited to just two levels, it may be desirable to provide a queue buffer to store information awaiting writing to the electronic DASD. In such a scheme, data pages earmarked for replacement are immediately transferred to the queue buffer. Data pages are allowed to accumulate in the queue, for example, as long as simultaneous writing of all pages in the queue buffer into the DASD is possible, and/or until the queue buffer is full. Naturally, all pages in the queue buffer are available for recall if needed.

In addition, the invention can be extended (with a larger allocation) such that the algorithm does not trigger a parallel write until three, four, five or more common chip address are detected. However, in such a case, the parallel write period is lengthened since at least some chips in nonvolatile semiconductor memory would have to execute multiple write operations. All addresses on all chips, however, can share the relatively long erase period (e.g., 1 millisecond), and multiplexing of the shorter write data portions (e.g., 10–100 microseconds) would result in only minor increase in the total data transfer interval. This could effectively reduce the write blockage by another factor of five or so. The extension is somewhat more limited, however, than the original algorithm because subsequent common chip addresses will occur more frequently as the allocation fills up. Also, multiple write cycles to a common chip in the nonvolatile semiconductor memory require additional time, notwithstanding that the erase operation is shared.

The invention can likewise be extended with today's technology by a segmentation of each nonvolatile chip into multiple regions (for example, 4 or more regions) each of which could sustain parallel erase and parallel write operations. Because a region (or "memory segment") contains less data pages, more pages can accumulate at the backing store before a common segment address is detected by the directory. Such an extension could reduce write blockage by another factor of ten or so.

Obviously, the above-summarized extensions could be used together in any desired combination.

Figure 4:
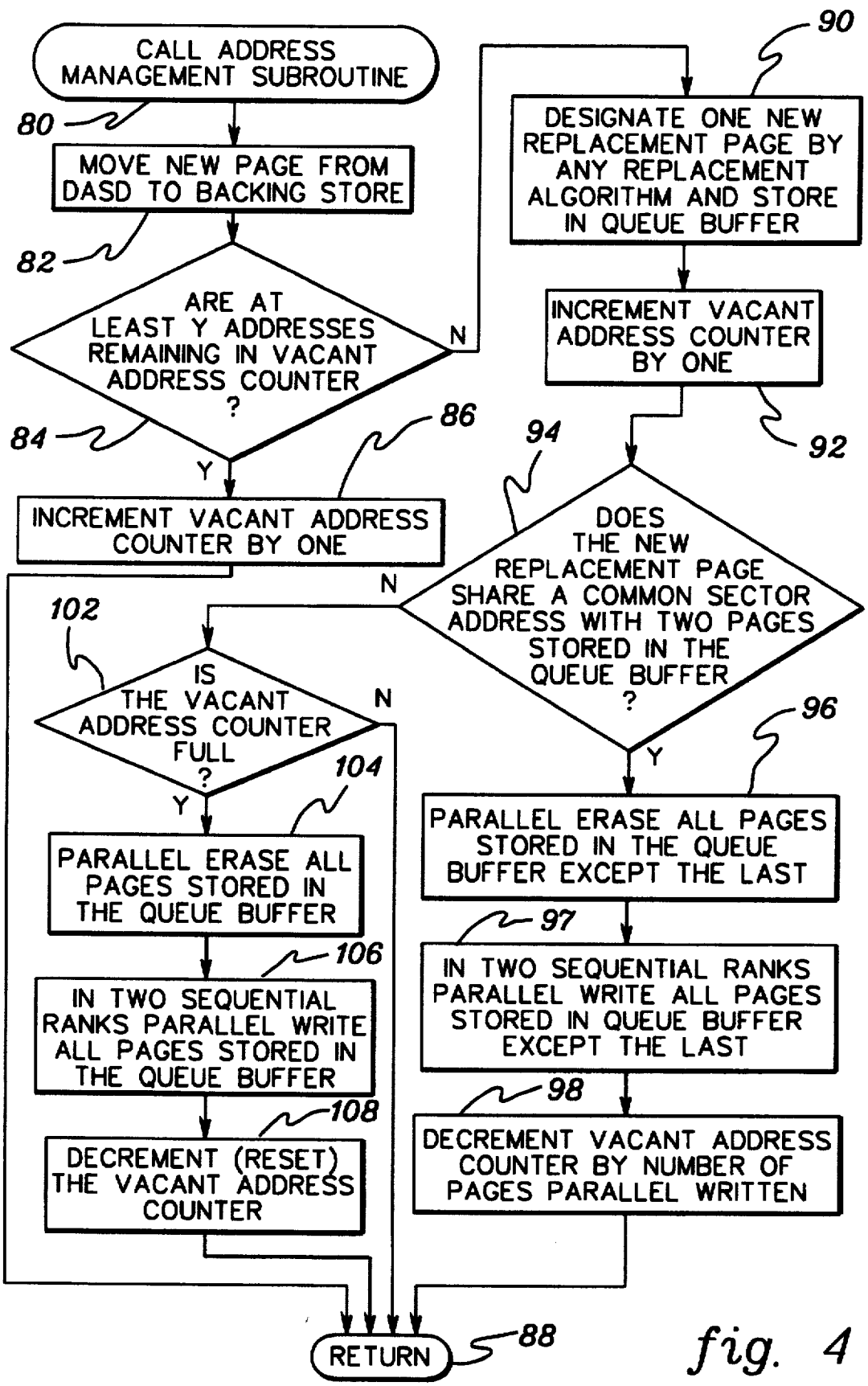
FIG. 4 is a flowchart of another embodiment of a replacement page management subroutine pursuant to the present invention for control of data transfer from a backing store to nonvolatile semiconductor memory.

Another embodiment of a management subroutine pursuant to the present invention is shown in FIG. 4. This routine is similar to that presented in FIG. 3 except that the memory chips of the nonvolatile semiconductor memory are assumed to be subdivided into a plurality of segments (such as segments 32 in chips 30 of DASD 18 shown in FIG. 2). A plurality of data pages (for example, four) are further assumed to exist within each segment. The data pages of each chip segment share a unique set of support electronics (not shown) such as address drivers and/or bit drivers. (Thus, pages which share a common segment within a chip can be simultaneously erased, but not simultaneously written, while segments of a common chip may be both simultaneously erased and simultaneously written.) The management subroutine of FIG. 3 is principally modified in FIG. 4 to account for such a nonvolatile semiconductor memory configuration and to trigger a parallel write after three common chip addresses are detected.

The housekeeping subroutine is called, 80 "Call Address Management Subroutine," whenever a new data page is moved from the DASD into backing store, 82 "Move New Page From DASD To Backing Store." The processor then determines whether more than a predetermined number 'Y' of address spaces remain in the backing store by reference to a vacant address counter (see FIG. 1 discussion above), 84 "Are At Least Y Addresses Remaining In Vacant Address Counter?" If "yes", then there is extra memory space remaining in the backing store. Therefore, the vacant address counter is incremented by one, 86 "Increment Vacant Address Counter By One," and return is made to the point of call, 88 "Return." In such a case, there is no need to designate a new replacement page within the backing store for ultimate transfer to the DASD.

Once less than the threshold number 'Y' of empty address spaces remain within the backing store, then (from inquiry 84) the processor designates a new replacement page (using any conventional replacement algorithm) for the new page being moved from the DASD to backing store. If desired, the new replacement page can be stored in a queue buffer 21 (FIG. 1), 90 "Designate One New Replacement Page By Any Replacement Algorithm And Store In Queue Buffer." Thereafter, the vacant address counter is incremented by one, 92 "Increment Vacant Address Counter By One," and inquiry is made into whether the new replacement page shares a common sector address with (by way of example) two additional replacement pages stored in the queue buffer, 94 "Does The New Replacement Page Share A Common Sector Address With Two Pages Stored In The Queue Buffer?" As with the previous algorithm, this predetermined condition could comprise a single duplication, or a match of four replacement pages, five replacement pages, etc.

If the condition in inquiry 94 is met, i.e., the new replacement page shares a common sector address with two stored replacement pages, then a parallel erase is conducted at the nonvolatile semiconductor memory addresses associated with the replacement pages, 96 "Parallel Erase All Pages Stored In The Queue Buffer Except The Last," and the pages stored in the queue buffer are parallel written in two sequential ranks into the nonvolatile semiconductor memory, 97 "In Two Sequential Ranks Parallel Write All Pages Stored In Queue Buffer Except The Last." Thereafter, the vacant address counter is decremented by the number of pages parallel written to the DASD, 98 "Decrement Vacant Address Counter By Number of Pages Parallel Written," and return is made to the point of call, 88 "Return."

Alternatively, in this example if the new replacement page does not share a common sector address with two pages already stored in the queue buffer, then inquiry is made into whether the vacant address counter is full, 102 "Is The Vacant Address Counter Full?" If "no", then return is made to the point of call since neither predetermined condition of this subroutine has been met, 88 "Return." If, however, the vacant address counter is full, then a parallel erase at the DASD occurs, 104 "Parallel Erase All Pages Stored In The Queue Buffer," and all replacement pages stored in the queue buffer are parallel written to the DASD in two sequential ranks, 106 "In Two Sequential Ranks Parallel Write All Pages Stored In The Queue Buffer. Finally, the vacant address counter is reset, 108 "Decrement (Reset) The Vacant Address Counter," and return is made to the point of call, 88 "Return."

As a benefit to the processing described herein, synchronization and predictability of the erase period and write periods opens the opportunity for the data processing system to "steal" DASD read cycles during, for example, the extended erasure period. "Stolen" read cycles further lessen the overall system's vulnerability to write blockage by providing holes in the write blockage period. In principle, stolen read cycles should be possible in any electronic DASD organization. However, the method of simultaneous synchronized write cycles described herein above makes the implementation of stolen read cycles easier and more practical.

The advantages to the approach presented are numerous. The occurrence of write blockage can be reduced by the same magnitude as the magnitude of difference between the length of the write cycle and the length of the read cycle. That is, for memory technologies in which the write cycles are 10× longer than the read cycles, write blockage frequency can be reduced by 10×. Thus, data processing systems can take full advantage of the improved access time offered by nonvolatile semiconductor memory. The memory allocation within the main store for designated data pages is minimal, and the data allocated for replacement is still available for accessing by the CPU while awaiting contemporaneous writing into the nonvolatile semiconductor memory. Employing a simultaneous erase cycle within nonvolatile semiconductor memory presents more than enough time to mask serial transfer of data pages along with their associated addresses needed for a subsequent parallel write operation within the nonvolatile semiconductor memory. The approach can be employed with any hierarchical memory structure for any computer system or multicomputer system employing nonvolatile semiconductor memory as one of the levels within the hierarchical memory.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

I claim:

1. In a data processing system having a first storage means, a long write cycle/short read cycle storage means, and a data bus coupled between said first storage means and said long write cycle/short read cycle storage means, said long write cycle/short read cycle storage means being operable in a read cycle and a write cycle, said write cycle being substantially longer than said read cycle, a control method for transfer of data pages from said first storage means to said long write cycle/short read cycle storage means, comprising the steps of:

(a) designating a first data page stored in said first storage means to be written to a home address in said long write cycle/short read cycle storage means;

(b) designating at least one additional data page stored in said first storage means to be written to home addresses said long write cycle/short read cycle storage means, each home address of each data page of said at least one additional data page being unique with respect to the home addresses of all previously designated data pages such that the writing of all designated data pages to said long write cycle/short read cycle storage means may be accomplished simultaneously; and (c) upon occurrence of a time independent predetermined condition, contemporaneously transferring said first data page and said at least one additional data page from said first storage means to said long write cycle/ short read cycle storage means via said data bus, and simultaneously writing said first data page and said at least one additional data pages into said long write cycle/short read cycle storage means at said home addresses.

2. The control method of claim 1, further comprising simultaneously erasing any information stored in said long write cycle/short read cycle storage means at said home addresses of said designated first and said at least one additional data pages, said erasing occurring prior to said simultaneously writing said first and said at least one additional designated data pages.

3. The control method of claim 1, wherein said time independent predetermined condition comprises designating for writing to said long write cycle/short read cycle storage means at least one data page having a home address in said long write cycle/short read cycle storage means which cannot be written to simultaneously with one or more of the data pages previously designated for simultaneous writing to home addresses in said long write cycle/short read cycle storage means.

4. The control method of claim 1, wherein said long write cycle/short read cycle means comprises multiple semiconductor memories capable of being simultaneously written to, and wherein each of said semiconductor memories is segregated into multiple memory segments capable of being simultaneously erased and simultaneously written to, each home address of said designated data pages including a sector address identifying a particular memory segment within one of said multiple semiconductor memories, and wherein said time independent predetermined condition comprises designating for writing to said long write cycle/ short read cycle storage means of at least one data page having a sector address in said long write cycle/short read cycle storage means which cannot be written to simultaneously with one or more of the data pages previously designated for simultaneous writing to home addresses in said long write cycle/short read cycle storage means.

5. The control method of claim 1, further comprising counting each of said first and said at least one additional designated data pages and wherein said time independent predetermined condition comprises.

6. The control method of claim 1, further comprising storing said first and said at least one additional designated data pages in a queue buffer prior to said step of contemporaneously transferring said first and said at least one additional designated data pages.

7. The control method of claim 6, further comprising erasing all data pages from said queue buffer subsequent to said step of contemporaneously transferring said designated data pages.

8. The control method of claim 1, wherein said first data page and said at least one additional data page are designated, through a 'least recently used' standard, as replacement pages for data pages transferred to said first storage means from said long write cycle/short read cycle storage means.

9. The control method of claim 1, wherein said steps of designating said first data page and said at least one additional data page include assigning a replacement flag to each designated data page in said first storage means.

10. The control method of claim 1, wherein said first storage means includes a backing store and a cache.

11. The control method of claim 1, further comprising monitoring a number of addresses remaining vacant in said first storage means and initiating said step of designating said first data page upon reaching a predefined minimum number of vacant addresses remaining in said first storage means.

12. A method for simultaneously writing a plurality of designated data pages from a main storage buffer into a long write cycle/short read cycle storage means, said long write cycle/short read cycle storage means being operable in a read cycle and a write cycle, said write cycle being substantially longer than said read cycle, said method comprising the steps of:

(a) writing 'N' data pages into said main storage buffer, 'N' being an integer $\geq 1$, said main storage buffer having 'Z' data pages previously stored therein, wherein 'Z' is an integer $\geq 1$;

(b) designating a replacement data page from said 'Z' data pages for each of at least two of said 'N' data pages written into said main storage buffer in said step (a); and (c) subsequent to said step (b), and upon occurrence of a predetermined time independent condition, simultaneously writing said designated replacement data pages into said long write cycle/short read cycle storage means.

13. The method of claim 12, wherein said predetermined time independent condition comprises designating a predefined number of replacement pages.

14. The method of claim 12, wherein said predetermined time independent condition comprises designating a replacement page which cannot be written to said long write cycle/short read cycle storage means simultaneously with a previously designated replacement page.

15. The method of claim 12, wherein said long write cycle/short read cycle storage means comprises a plurality of nonvolatile semiconductor memory chips.

16. The method of claim 12, wherein said long write cycle/short read cycle storage means comprises a nonvolatile semiconductor memory chip having a plurality of addressable memory segments therein.

17. The method of claim 12, further comprising parallel erasing information stored in said long write cycle/short read cycle storage means prior to said simultaneous writing step (c).

18. The method of claim 12, further comprising storing in a queue buffer, prior to said step (c), said data pages designated in said step (b).

19. A data processing system comprising:

a central processor;

a main store coupled to said central processor for holding data pages to be processed;

a nonvolatile semiconductor memory for holding data pages at predefined addresses, said nonvolatile semiconductor memory having a write cycle that is at least an order of magnitude longer than a read cycle;

a data bus coupled between said main store and said nonvolatile semiconductor memory; and means for controlling transfer of data pages from said main store to said nonvolatile semiconductor memory, said transfer control means including means for designating at least two data pages in said main store for contemporaneous transfer to said nonvolatile semiconductor memory, means for determining whether a designated data page may be written to said nonvolatile semiconductor memory simultaneously with all previously designated data pages of said at least two designated data pages.

means for contemporaneously transferring upon occurrence of a time independent predetermined condition said at least two designated data pages from said main store to said nonvolatile semiconductor memory via said data bus for writing into said nonvolatile semiconductor memory, and means for simultaneously writing said at least two designated data pages into said nonvolatile semiconductor memory.

20. The data processing system of claim 19, wherein said time independent predetermined condition comprises designating a predetermined number of data pages, and wherein said system further comprises a vacant address counter for counting vacant address spaces within said main store.

21. The data processing system of claim 19, wherein a replacement flag is preassigned to each data page within the data processing system, and wherein said means for designating further includes means for activating a replacement flag to represent designation of a corresponding data page in said main store for transfer to said nonvolatile semiconductor memory.

22. The data processing system of claim 19, wherein said main store comprises a two level hierarchical memory including a backing store and a cache.

23. The data processing system of claim 19, further comprising a queue buffer, and wherein said designating means includes means for storing each of said designated at least two data pages in said queue buffer for transfer to said nonvolatile semiconductor memory upon occurrence of said predetermined condition.

24. The data processing system of claim 19, wherein said time independent predetermined condition comprises designating a data page which cannot be written to said nonvolatile semiconductor memory simultaneously with all previously designated data pages of said at least two designated data pages.

25. In a data processing system including a nonvolatile storage means having a write cycle that is at least an order of magnitude longer that a read cycle, a volatile storage means, and means for transferring data pages between said nonvolatile storage means and said volatile storage means, a data transfer method comprising the steps of:

transferring 'X' data pages to said volatile storage means, each of said 'X' data pages having a home address in said nonvolatile storage means, 'X' being an integer $\geq 1$;

sequentially transferring 'N' data pages to said volatile storage means, each data page having a home address in said nonvolatile storage means, designating among said 'X' data pages pages of said a replacement page for each of said 'N' data pages for transfer from said volatile storage means to said nonvolatile storage means; and transferring said designated replacement pages as a group from said volatile storage means for simultaneous writing to said nonvolatile storage means upon at least one of (a) said volatile storage means storing 'X'+'N' data pages where 'X'+'N' equals a predetermined number, and (b) at least two designated replacement pages being incapable of simultaneous writing to said nonvolatile storage means.

\* \* \* \* \*

UNITED STATES PATENT AND TRADEMARK OFFICE
CERTIFICATE OF CORRECTION

PATENT NO. : 5,594,883
DATED : Jan. 14, 1997
INVENTOR(S) : Wilbur D. Pricer

It is certified that error appears in the above-indentified patent and that said Letters Patent is hereby corrected as shown below:

Col. 9, line 55, claim 5  "comprises." should be --comprises counting a predetermined number of data pages.--

Col. 12, line 23, claim 25  "pages pages of said a" should be --pages a--.

Signed and Sealed this

Fifteenth Day of July, 1997

Attest:

BRUCE LEHMAN

Attesting Officer   Commissioner of Patents and Trademarks